United States Patent [19]

Godfrey et al.

[11] Patent Number: 5,292,780
[45] Date of Patent: Mar. 8, 1994

[54] COMPOSITIONS FOR FRICTION ELEMENTS

[75] Inventors: Christopher G. Godfrey, South Glamorgan; Bryan H. McCormick, Newport, both of United Kingdom

[73] Assignee: BP Chemicals Limited, London, England

[21] Appl. No.: 551,203

[22] Filed: Jul. 11, 1990

[30] Foreign Application Priority Data

Jul. 19, 1989 [GB] United Kingdom ............... 8916445

[51] Int. Cl.$^5$ ............................................. C08J 5/14
[52] U.S. Cl. ..................................... 523/152; 523/153; 523/155; 523/156; 523/157; 523/158; 524/509; 524/511; 525/133; 525/134; 525/502
[58] Field of Search ............. 523/152, 153, 155, 156, 523/157, 158; 524/509, 511; 525/133, 134, 502

[56] References Cited

U.S. PATENT DOCUMENTS

| | | | |
|---|---|---|---|
| 3,280,217 | 10/1966 | Lader et al. | 525/133 |
| 3,644,252 | 2/1972 | Shenfeld et al. | 524/522 |
| 4,219,452 | 8/1980 | Littlefield | 524/423 |
| 4,226,758 | 10/1980 | Sumira | 524/594 |
| 4,244,994 | 1/1981 | Trainor et al. | 428/37 |

Primary Examiner—Paul R. Michl
Assistant Examiner—John G. Guarriello
Attorney, Agent, or Firm—Brooks, Haidt, Haffner & Delahunty

[57] ABSTRACT

This invention relates to a composition suitable for use in friction elements and comprises a frictional material and a binder, the latter being a blend of a polyvinyl alkyl ether with a phenolic resin and optionally a rubber.

Compared with conventional friction elements based on organic polymers, the elements produced using the compositions of the present invention shows increases in flexural strength of up to 50% with no loss in wear or friction performance.

16 Claims, No Drawings

COMPOSITIONS FOR FRICTION ELEMENTS

The present invention is concerned with improved resin compositions suitable for the preparation of friction elements, and friction elements prepared therefrom.

Friction elements such as automotive brake linings and disc pads, railway brake blocks and clutch facings can be made by bonding a friction material with a resin. Asbestos is commonly used as a friction material, either as a woven fabric or in fibre form. The asbestos is often bonded with a phenolic resin. When such friction elements are subjected to severe brake or clutch operating conditions, the high temperatures produced tend to breakdown the element with resulting wear and/or loss in frictional properties.

In spite of this, friction elements made hitherto from material other than asbestos have failed to match the performance of asbestos elements. It is an object of the present invention to enable formulation of compositions, which need not necessarily use any asbestos, without any significant loss of performance.

Accordingly the present invention is a composition suitable for use in a composite, said composition comprising a frictional material and a binder characterised in that the binder comprises a blend of
 a) a polyvinyl alkyl ether (PVAE) and
 b) a curable phenolic resin and optionally
 c) a rubber.

The frictional material used in the compositions of the present invention can include well known materials such as asbestos, glass fibre, mineral wools such as glass wool, rock wool and slag wool, ferrous fibres, organic polymeric fibres such as polyaramid fibres, especially Kevlar (Re8d. Trade Mark), ceramic fibres and the like. A feature of this invention is that asbestos fibres, hitherto an essential component of frictional elements, need not be used to achieve the desired performance.

In addition to the fibrous components referred to above, the compositions may contain other performance modifiers such as friction dust, barytes, china clay, slate powder, silica, pumice stones, metal oxide powders and metal particles such as copper, zinc, brass and steel either in the form of powder or turnings.

The binder used in the present invention comprises a blend of polyvinyl alkyl ether (hereafter PVAE) and a curable phenolic resin and optionally a rubber.

The PVAE used in the blend should preferably be such that when blended with e.g. the curable phenolic resin, it should form a homogeneous single phase blend, particularly when the blend is used to produce friction elements.

Examples of suitable PVAE's that may be used include polyvinyl methyl ether (hereafter PVME) and polyvinyl ethyl ether (hereafter PVEE).

PVME, for instance, is a commercially available polymer. The PVAE suitably has a number average molecular weight of at least 2000, preferably 7000–35000 and a weight average molecular weight in the region of 35000–100,000.

One of the alternatives in this blend is a curable phenolic resin.

Novolac resins are a type of phenolic resin which cannot be cured to a thermoset cross-linked product merely by heating. The commercially available novolac resins are prepared from a phenolic feedstock consisting wholly or mainly of phenol itself. Although they are not curable directly by heating they can be cured to thermoset products if cross-linking agents are mixed with them.

We have found that the behaviour of curable novolac resins when blended with PVAE resins is different from that of non-curable resins. In particular, polymers which are compatible with non-curable resins are not necessarily compatible with curable novolacs.

As explained above novolac resins are not curable directly by heating. By "curable" novolac resin we mean a phenolic resin which is curable when a cross-linking agent is added to it. Such phenolic resins are commercially available and methods of making them will be well-known to those skilled in the manufacture of phenolic resins. Thus the phenolic feedstock used in the preparation of the resin preferably consists substantially only of phenol. The novolac is preferably a phenol-formaldehyde resin. The preparation of phenol-formaldehyde resins is described in "Phenolic Resins-Chemistry, Applications and Performance, Future Directions", A. Knop, L. A. Pilato, Springer Verlag 1985 p. 95 and in "Preparative methods of Polymer Chemistry" 2nd edition, Interscience 1968.

In the preparation of phenol-formaldehyde novolacs typical reactant ratios which may be used are 0.75–0.9 moles of formaldehyde per mole of phenol. The number average molecular weight of the novolac may for example be in the range 500 to 1500.

The curable phenolic resin is suitably the major component of the blend and preferably constitutes at least 60% by weight of the blend, more preferably at least 80% by weight based on the phenolic resin and PVME in the blend.

The blend may be prepared by mixing particles of solid curable phenolic resin and PVAE and then melting the mixture with stirring. Alternatively the components of the blend may be brought to the molten state separately and then mixed together. It may be advantageous to allow the molten mixture to cool and then to comminute it and remelt it to obtain a more homogeneous mixture. A further alternative is to polymerise a mixture of phenol, formaldehyde and PVAE in one pot.

The blend used in the present invention may be prepared in the presence of a cross-linking agent to give a product which is wholly or partially cross-linkable, by mixing together finely divided resin, PVAE, and cross-linking agent and heating. However, as prolonged mixing of the resin and PVAE in the molten state may be required to obtain a homogeneous mixture it is preferred to carry out the preparation of the blend in the absence of cross-linking agent in order to avoid premature curing.

The most commonly used cross-linking agent for novolac resins, namely hexamethylene tetramine, may be used where a cross-linked material is required. The blend used in the present invention may be partially cured, i.e. sufficient links between the novolac resin units may be established to significantly increase its molecular weight without making it fully thermoset. Alternatively, the blend may be fully cured to an infusible thermoset resin. The degree of cure may be controlled by the quantity of cross-linking agent used and temperature used in the curing step. Whichever method is used, it should be ensured that the fibres and/or fillers used as the frictional material are fully mixed with the resin blend prior to the composition being fully cured.

The blends referred to above may contain in addition to phenolic resins, a rubber. Such rubber may be natural or synthetic. Where synthetic rubbers are used these may for instance be a acrylonitrile-butadiene, a butadiene-styrene or a polybutadiene, rubber.

The rubber component may partially replace the curable phenolic resin in the composition.

The binder content of the formulation is suitably in the range from 5 to 40% w/w.

The frictional material may be bound with the binder to form the friction element in one of the following ways, depending upon the end use by:
a) Compression moulding for drum brake linings, disc pads and clutch facings;
b) A dry mix post-forming process for drum brake linings;
c) A wet mix process for drum brake linings; and
d) Impregnation of woven fibre for drum brake linings and clutch facings.

More specifically, the compression moulding technique referred to in (a) above is described below in detail.

The process consists of dry mixing the fibres, fillers and mould, during which time the resin cures.

After mixing, the next step is to consolidate the dry mix under heat and pressure. As the compression ratio of the mix to final moulding is approximately in the region of 20:1 to 5:1, preferably 15:1 to 7:1, e.g. 8. 10:1, it would be necessary to have a deep mould in order to hot press the dry mix. To overcome this difficulty it is customary to prepare a preform by cold pressing a weighed quantity of the dry mix in a simple mould, the shape of which approximates to the final moulding, at a pressure of e.g. 8. 200-2000 lb/in$^2$ (14-140kg/cm$^2$).

The cold pressed preform can then be transferred to the hot mould and pressure is applied. Typical moulding conditions are ½-1 minute per mm thickness at a mould temperature of e.g. 150°-160° C. (302°-320° F.) and a pressure of e.g. 1 ton/in$^2$ (157 kg/cm$^2$).

During the pressing cycle it is necessary to breathe the moulding. This entails releasing the pressure for a short time to allow volatiles to escape. The production of a successful moulding frequently depends on the correct choice of breathing cycle. Insufficient breathing can result in blisters due to trapped volatiles, whilst breathing too late in the moulding cycle may cause delamination of the moulding. After pressing, the mouldings are generally stoved in an oven at about 150°-200° C. (302°-392° F.) for several hours, in order to obtain optimum performance characteristics.

The invention will now be illustrated by reference to the following:

EXAMPLE 1

This illustrates a preparation of a blend of novolac resin and PVME.

The novolac resin used in the preparation of the blend was a commercially available resin supplied by BP Chemicals Ltd. It was made by condensing a phenolic feedstock with formaldehyde and PVME as follows:

The following were charged to a flask fitted with a reflux condenser, thermometer and stirrer.

Phenol (7008ms), formalin 36.6% (551 gms) and oxalic acid (4.98ms) [dissolved in water (140 gms)] were mixed with polyvinyl methyl ether (molecular weight Mw 42,500 and Mn 8,500) supplied as a 50% solution in water (140 gms).

The mixture was heated to reflux and maintained at reflux for 185 mins. The mixture was distilled under vacuum (26in Hg) to a temperature of 130° C. to dehydrate the resin. The resin was poured and hardened to a solid on cooling.

This was then ground with a 10% addition of hexamine, to give the resin used in the Examples below for producing friction elements.

This resin blend had a pellet flow at 125° C. of 53 mm.

In the following Example the PVME modified phenolic resin prepared as above was used in preparing friction elements. The raw materials and process used to produce the element are listed below:

| RAW MATERIALS | MATERIAL | SOURCE |
| --- | --- | --- |
| Glass Fibre | Chopped Strands - 3 mm FGCS 1617 | ex Owens Corning |
| Polyaramid Pulp | Kevlar* 979 | ex Du Pont |
| Brass Swarf | 20–80 Mesh | ex Ronald Brittan |
| Heavy Magnesium Oxide | Ground | ex Taycrest |
| Alumina | MA65 | ex B.A. Chemicals |
| Barytes | Ground | ex Hopton Minerals |
| Hydrated Lime | Limbux | ex ICI |
| Cellobond* Friction Dust | J4103D | ex BP Chemicals |

| FORMULATION | |
| --- | --- |
| Glass Fibre - 3 mm FGCS 1617 | 18 p.b.w. |
| Polyaramid Pulp - Kevlar* 979 | 2 p.b.w. |
| Brass Swarf - 20–80 mesh | 10 p.b.w. |
| Heavy Magnesium Oxide (MgO) | 12 p.b.w. |
| Alumina (Al$_2$O$_3$) - Fine Grade - MA65 | 3 p.b.w. |
| Barytes (BaSO$_4$) | 18 p.b.w. |
| Hydrated Lime (Ca(OH)$_2$) - LIMBUX | 12 p.b.w. |
| Cellobond* Friction Dust J4103D | 10 p.b.w. |
| Resin as shown in Example 1 above | 15 p.b.w. |
| | 100 |

| Mixing: | |
| --- | --- |
| Lodige type mixing equipment. | |
| a) Polyaramid pulp and barytes | 10 mins. |
| b) Remaining raw materials, except glass fibre, added and mixed | 5 mins. |
| c) Glass fibre added and mixed | 2 mins. |
| Preforming | |
| Ambient temperature 20–25° C. | |
| Pressure 30 MNm$^{-2}$ | |
| Press-Curing | |
| Pressure 30 MNm$^{-2}$ | |
| Temperature 160° C. | |
| Time 10 mins. | |
| Breathe for 15 secs. at 1.5 mins. | |
| Post-Curing | |
| Temperature 150° C. - 16 hours (into hot oven) | |

*Registered Trademark

EVALUATION OF FRICTION AND WEAR CHARACTERISTICS

Fade and friction performance were assessed using full size disc pads prepared as above. Wear properties were determined using specimens cut from full size disc pads.

The test schedules used were as follows:

FRICTION AND FADE PERFORMANCE

Test Schedule TD 15

This test is carried out using an inertia dynamometer fitted with a Girling M16 caliper and operating at constant torque.

| Inertia of machine | 35 Kg m$^2$ |

-continued

| Speed of machine | 478 rpm = 48 kph |
| --- | --- |
| | 955 rpm = 96 kph |
| Decelerations | 0.2 g = torque 26 kg m |
| | 0.3 g = torque 39 kg m |
| | 0.4 g = torque 52 Kg m |
| | 0.5 g = torque 65 Kg m |
| | 0.6 g = torque 78 Kg m |

Test Procedure

1. Bedding Procedure Carry out at least 30 stops from 48 kph using a deceleration of 0.25g. The temperature before each application of the brake should be below 100° C. The cooling fan should be on during this cycle.
2. Weigh and measure disc pad thickness. Pre-fade tests from 48 kph.
1 application from 48 kph to rest at each of the following decelerations, 0.2, 0.3, 0.4, 0.5, and 0.6% g. Cooling fan should be on and the temperature before each application should be below 100° C.
4. Pre-fade tests from 96 kph.
5. Fade cycle from 96 kph.
This consists of 25 consecutive stops using a deceleration of 0.5. The temperature at the beginning of each stop should be as follows:

| Stop No. | Temp °C. |
| --- | --- |
| 1 | 95 |
| 2 | 150 |
| 3 | 190 |
| 4 | 225 |
| 5 | 250 |
| 6 | 275 |
| 7 | 295 |
| 8 | 315 |
| 9 | 325 |
| 10 | 335 |
| 11 | 345 |
| 12 | 345 |
| 13 | 350 |
| 14 | 355 |
| 15 | 360 |
| 16 | 360 |
| 17 | 360 |
| 18 | 360 |
| 19 | 360 |
| 20 | 365 |
| 21 | 365 |
| 22 | 365 |
| 23 | 365 |
| 24 | 365 |
| 25 | 365 |

The cooling fan must be off during this fade cycle.
6. Post fade tests.
These are a repeat of steps 3 and 4.
7. Re-weigh and measure disc pad thickness and calculate the losses for the test.
8. Plot results and record losses.

Scale Rig Wear Test Schedules

Scale Factor—9.4:1 for Girling type 14 pad
Sample size—0.74 ins × 0.61 ins
Inertia—0.15 lbs. ft. sec$^2$ (0.2 Kgm$^2$)
2760 r.p.m. = 96 k.p.h.
5.32 NM = 25% g.
10.6 NM = 50% g.

1. WR2 — Wear Assessment at 150° C. 300 stops carried out from an initial temperature of 150° and 2760 r.p.m. using a torque setting of 5.32 NM. Sample was weighed and measured before and after test.
(Results are quoted as losses per hundred brake applications)

2. WR3—Wear Assessment at 200° C.
200 stops carried out from an initial temperature of 200° and 2760 r.p.m. using a torque setting of 5.32 NM.
Sample to be weighed and measured before and after test. Results quoted as losses per hundred brake applications.

3. WR4 — Wear Assessment at 300° C.
150 stops carried out from an initial temperature of 300° and 2760 r.p.m. using a torque setting of 5.32 NM. Sample to be weighed and measured before and after test. Results quoted at losses per hundred brake applications.

4. WR5 — Wear Assessment at 400° C.
A total of 50 brake applications are made from 2760 r.p.m. at the following temperatures and torque settings.

| Stop No: | Temperatures | Torque |
| --- | --- | --- |
| 1 | 30 | |
| 2 | 80 | |
| 3 | 150 | |
| 4 | 200 | |
| 5 | 240 | 10.6 NM |
| 6 | 280 | |
| 7 | 310 | |
| 8 | 340 | |
| 9 | 365 | |
| 10 | 390 | |
| 11 | 410 | |

Stop numbers 12–50 inclusive are carried out at a torque setting of 5.32 NM and an initial brake application temperature of 400° C.

FRICTION ELEMENT PHYSICAL CHARACTERISTICS AND PERFORMANCE

1. Composite Density: 2.18 g/cc
2. Mechanical Properties: Flexural strength 63.14 MNm$^{-2}$

| WEAR PERFORMANCE | | | | | | | |
| --- | --- | --- | --- | --- | --- | --- | --- |
| Weight and Thickness losses per 100 Brake Applications | | | | | | | |
| WR2 | 150° C. | WR3 | 200° C. | WR4 | 300° C. | WR5 | 400° C. |
| 0.12 g | 0.20 mm | 0.19 g | 0.31 mm | 0.36 g | 0.52 mm | 1.82 g | 2.68 mm |

| FRICTION PERFORMANCE | | | | | |
| --- | --- | --- | --- | --- | --- |
| FRICTION COEFFICIENTS | | | | | |
| PRE-FADE | | FADE | | POST-FADE | |
| Mu48* | Mu96* | Mean Mu | Min.Mu | Mu48* | Mu96* |
| 0.38 | 0.42 | 0.47 | 0.21 | 0.66 | 0.59 |

*Average friction level at given speed (speed in Kmh$^{-1}$).

Compared with friction elements based on unmodified and/or resins modified by other organic compounds, increases in flexural strength of up to 35% and 50% respectively are attainable. This is achieved with no loss in wear or friction performance.

We claim:

1. A composition suitable for use in a composite said composition comprising a frictional material and a binder characterised in that the binder comprises a blend of
   a) a polyvinyl alkyl ether (PVAE) and b) a curable phenolic resin.

2. A composition according to claim 1 wherein the frictional material comprises asbestos, glass fibre, mineral wools, ferrous fibres, organic polymeric fibres and ceramic fibres.

3. A composition according to claim 1 wherein the polyvinyl alkyl ether in the blend is polyvinyl methyl ether (PVME) or polyvinyl ethyl ether (PVEE).

4. A composition according to claim 1 wherein the PVAE has a number average molecular weight of at least 2000.

5. A composition according to claim 1 wherein the curable phenolic resin is a phenol-formaldehyde resin which has a cross-linking agent.

6. A composition according to claim 5 wherein the curable phenolic resin has a number average molecular weight in the range from 500–1500.

7. A composition according to claim 1 wherein the curable phenolic resin is present in an amount of at least 60% w/w of the blend.

8. A composition according to claim 1 wherein the blend of PVAE and the phenolic resin is a homogeneous, single phase blend.

9. A composition according to claim 1 wherein the binder content is in the range 5–40% w/w of the total composition.

10. A composition according to claim 1 wherein said composition comprises in addition to the frictional material performance modifiers selected from friction dust, barytes, china clay, slate powder, silica, pumice stones, metal oxide powders and metal particles.

11. A composition according to claim 1 wherein the binder blend also contains (c) a rubber.

12. A composition according to claim 11 wherein the rubber in the blend is a synthetic rubber.

13. A composition according to claim 12 wherein the synthetic rubber is selected from an acrylonitrile-butadiene rubber, a butadiene-styrene rubber and a polybutadiene rubber.

14. A composition as defined in claim 1 which additionally contains a cross-linking agent.

15. A composite friction element comprising a frictional material and a binder according to claim 1 or claim 14 wherein the composite frictional element is produced by binding the frictional material with the binder in one of the following ways depending upon and use by: (a) compression molding for drum linings, disc pads and facings; (b) a dry mix post-forming process for drum linings; (c) a wet mixing process for drum brake linings; or (d) impregnation of woven fibre lining for drum brakes and clutch facings.

16. A composite according to claim 15 wherein the compression moulding process is carried out by
   a) dry mixing the fibre, fillers and powdered phenolic resin under pressure in a heated mould and allowing the resin to cure in the interim,
   b) consolidating the dry mix from (a) under heat and pressure (hot press) and
   c) stoving the hot pressed material at a temperature from 150°–200° C.

* * * * *

UNITED STATES PATENT AND TRADEMARK OFFICE
CERTIFICATE OF CORRECTION

PATENT NO. : 5,292,780
DATED : March 8, 1994
INVENTOR(S) : Christopher G. Godfrey and Bryan H. McCormick It is certified that error appears in the above-indentified patent and that said Letters Patent is hereby corrected as shown below:

Col. 1, l. 36, correct the spelling of "(Regd."

Col. 3, l. 26, after "e.g." delete "8."

Col. 3, l. 61, change "7008ms" to --700gms--

Col. 3, l. 62, change "4.9 8ms" to --4.9 gms--

Col. 5, l. 12, "Carry out at least" should start a new line

Col. 5, 16 & 17 should read "3. Pre-Fade tests" and that should begin a new line Col. 5, between lines 22 and 23, insert "Perform same decelerations as for 48 kph"

Col. 5, 66 & 67 "300 stops carried out" should start a new sentence

Signed and Sealed this

Sixteenth Day of August, 1994

Attest:

BRUCE LEHMAN

Attesting Officer  Commissioner of Patents and Trademarks